Feb. 18, 1964   K. R. LAGLER   3,121,258
MOLDING APPARATUS
Filed Nov. 9, 1960   3 Sheets-Sheet 1
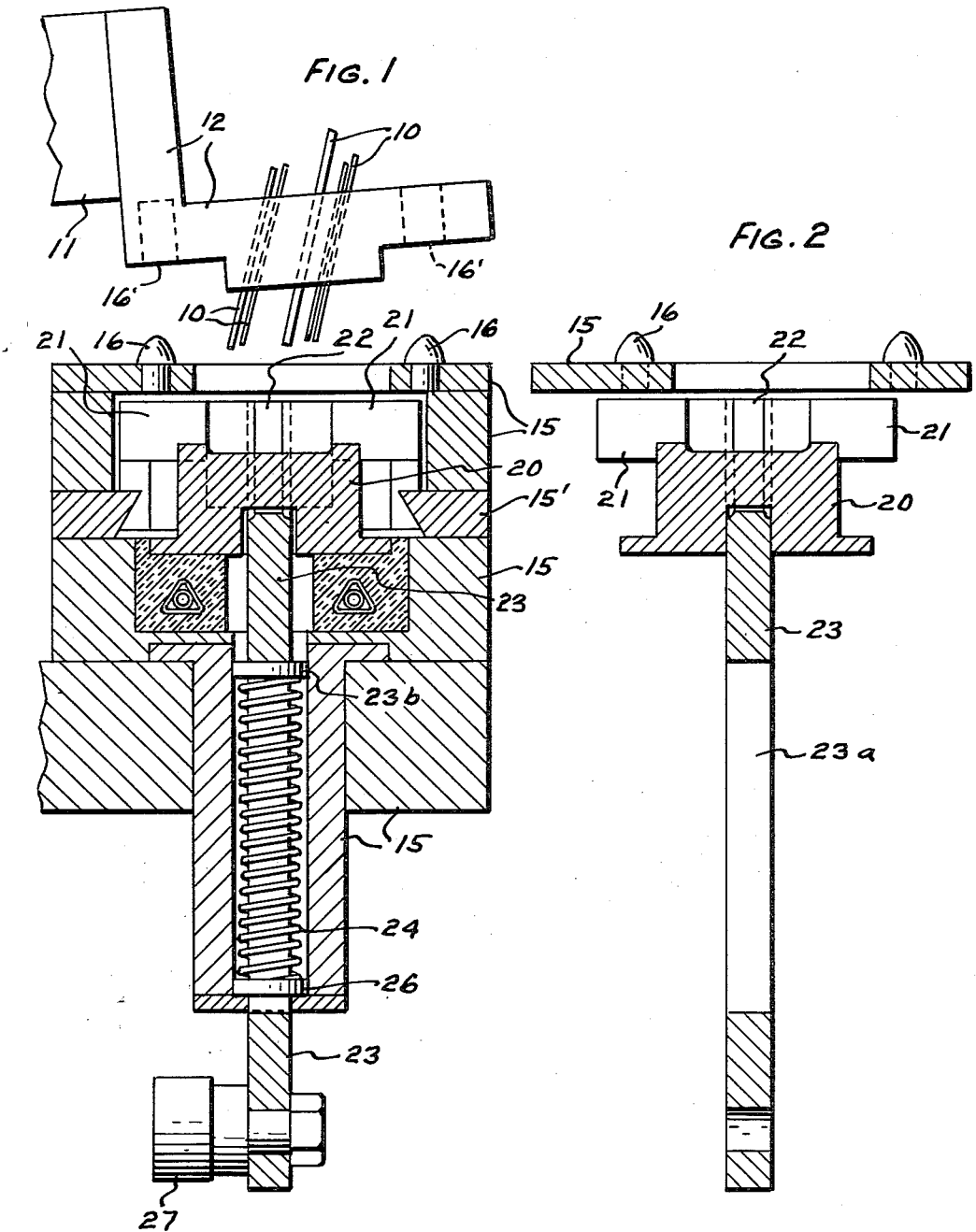
INVENTOR
K. R. LAGLER
BY
ATTORNEY

INVENTOR
K. R. LAGLER
BY
ATTORNEY

United States Patent Office 3,121,258
Patented Feb. 18, 1964

3,121,258
MOLDING APPARATUS
Karl R. Lagler, Indianapolis, Ind., assignor to Western Electric Company, Incorporated, New York, N.Y., a corporation of New York
Filed Nov. 9, 1960, Ser. No. 68,275
5 Claims. (Cl. 18—42)

This invention relates to molding apparatus, and more particularly to a molding machine wherein a preformed piece part is supported with one portion thereof in an open cavity mold, whereby the piece part may be anchored in a molded body formed within the mold cavity. It is an object of the invention to provide improved apparatus of such character.

It is common practice to form a molded body about one portion of a preformed piece part by supporting the preformed piece part with one portion thereof within an open cavity mold, the preformed piece part being supported in proper position with respect to the mold cavity by a suitable clamping device. This practice is sometimes employed to anchor one end each of a number of spring contact arms in their desired relative positions. A simple block of molded plastic thereby serves as an inexpensive substitute for the fastening devices and insulating plates and sleeves which are otherwise required for this purpose. It is preferred in most such applications that the clamping device continue to grip the exposed portions of the preformed piece parts since this clamping device forms the most convenient means for handling the completed piece part after the molding operation.

Prior art apparatus serving to form a molded body about one portion of a preformed piece part has suffered from one or more disadvantageous characteristics, a most serious characteristic being that the releasing of the mold from the molded body produces movement of the molded body with respect to the clamping device which holds the preformed piece part, such that the preformed piece part is subjected to destructive stresses.

In accordance with the preferred embodiment of the invention a first mold part forms a mold cavity wall facing against the direction of opening movement of a second mold part, whereby it prevents movement of the molded body with the second mold part. If the first mold part also retracts, its movement is parallel to the cavity wall it forms, whereby the wall remains in movement restraining contact with the molded body during initial mold opening movement. The second mold part may similarly prevent movement of the molded body with the first or another moving mold part.

Accordingly, it is another object of the present invention to provide improved apparatus of the character described above wherein the molded body is restrained against significant movement during the opening of the mold.

It is still another object of the present invention to provide apparatus of the character described above wherein one mold part defining the mold cavity is arranged to prevent movement of the molded body by another mold part or parts.

It is a further object of the invention to provide improved molding apparatus of the character described above wherein the mold parts which define the mold cavity prevent movement of the molded body during the opening of the mold and wherein means are provided for effecting the generally concurrent opening movement of various mold parts.

It is a still further object of the invention to provide improved molding apparatus having various of the characteristics specified above while being efficient and reliable in operation and economical to manufacture and use.

Other objects and advantages of the invention will become apparent by the reference to the following description and accompanying drawings illustrating preferred embodiments thereof, in which:

FIG. 1 is a partial, side elevational view, partially in cross section, of a molding machine incorporating the present invention;

FIG. 2 is a partial, cross-sectional, side elevational view of the mold of FIG. 1 taken along the center line of the mold cavity;

Figure 3:
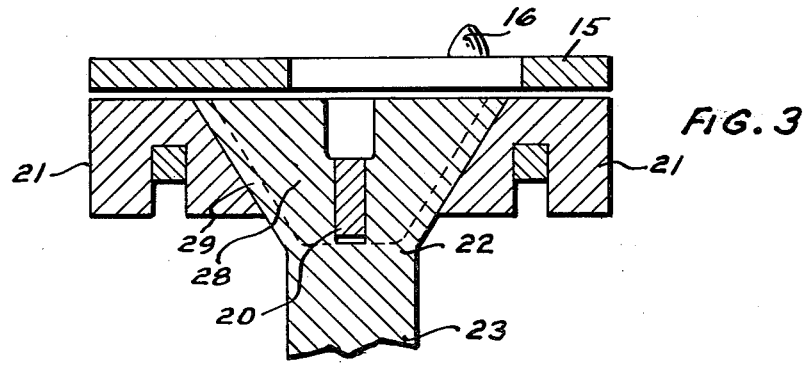
FIG. 3 is a partial, cross-sectional, end elevational view of the mold of FIG. 1 taken along the center line of the mold cavity.

The embodiment of the invention illustrated in FIGS. 1–5 is specifically designed to form a molded body about one end each of a plurality of spring contact arms 10, whereby the free or exposed ends of the contact arms may be supported for selective movement toward and away from each other to open and close electrical circuits. The molded body serves also as a means for mounting the assembled contacts.

A movable arm 11 has a fixture 12 secured thereto within which the spring contact arms 10 are readily assembled in their proper relative positions, and from which the completed contact assembly may readily be separated following the molding operation. Since this fixture 12 or clamping device may be of any conventional form and does not of itself constitute a feature of the present invention, it is not described in further detail herein. For the purpose of an understanding of the present invention, it is necessary only to appreciate that the arm 11 is pivotable or otherwise movable to advance the properly oriented spring contact arms 10 toward and into the mold cavity, described immediately below, and that the fixture 12 hold the contact arms in their proper relative positions during the formation of a molded body about the lower ends of the contact arms.

Arranged immediately below the fixture 12 in FIG. 1 is a mold which includes a frame or housing 15 within which various portions of the mold proper are movable between open and closed positions. Protruding from the upper portion of the mold housing 15 are suitable tapered pins 16 which may enter openings 16' in the fixture 12 when the fixture approaches the mold, whereby the fixture, and hence the contact arms 10, are accurately positioned with respect to the mold.

Figure 5:
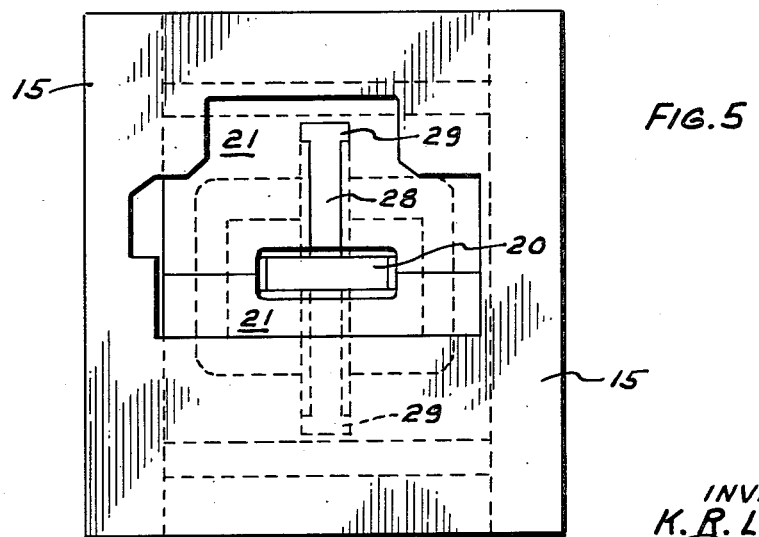
FIG. 5 is a plan view of the mold of FIG. 1.

The bottom wall of the mold cavity is formed by a fixed member 20 which is suitably mounted within the frame or housing 15, as in the manner shown in FIG. 1. The end walls are formed by two, main movable mold portions 21 as best seen in FIG. 5. Each side wall of the mold cavity is formed primarily by one of the two main mold portions 21 along with a forked mold portion 22. The main mold portions 21 are arranged for sliding movement within the housing 15, as for example on rails or guides 15' projecting inwardly from the outer walls of the housing.

The mold portion 22 is mounted on a plunger 23 which is guided for sliding movement within the housing 15 as best seen in FIG. 1. The plunger 23 is spring biased upwardly by a spring 24 which is arranged within a slot 23a in the plunger, the spring being compressed between a shoulder 23b on the plunger and a plate or washer 26 which is supported by the housing 15. A cam roller 27 which is secured to the bottom of the plunger 23 may be actuated at selected times to effect downward movement of the plunger 23 and of the mold portion 22.

As will be appreciated upon reference to FIGS. 2–5, the mold portion 22 is forked such that it may straddle the fixed mold portion 20, the upper arms of the forked mold portion extending upwardly beyond the fixed mold portion to form portions of opposed side walls of the mold cavity. It will be further appreciated that each of the two upper arms of the forked mold portion 22 lies within a recess in a corresponding one of the two main mold portions 21. Each of the main mold portions 21 in addition to being recessed to receive one of the upper arms of the forked mold portion 22 is shaped to receive the fixed mold portion 20, the two main mold portions 21 encompassing the fixed mold portion 20 when in closed position.

It will now be fully appreciated that when the two main mold portions 21 are in closed, abutting position, and the forked mold portion 22 is in its upper, closed position, an open-topped mold cavity is formed by these four mold portions. When the plunger 23 is moved downwardly, against the urging of the spring 24, the upper arms of the forked mold portion 22 are lowered at least to the level of the bottom cavity wall formed by the fixed mold portion 20. At the same time, the main mold portions 21 may be retracted, preferably such that the parting faces are drawn beyond the side walls of the previously defined mold cavity. A molded body which may have been formed within the cavity of the closed mold is then entirely free of those mold portions which defined the side and end walls of the mold cavity.

In the illustrated embodiment of the invention, cam means are provided through which opening and closing movement of the two main mold portions is effected by opening and closing movement of the forked mold portion 22. As may be seen best in FIGS. 3 and 4, the forked mold portion 22 has a tapered web 28 extending outwardly from each of its upper arms. As best seen in FIG. 5, the outer edge of each web has a flange 29 which dovetails within a slot in the corresponding main mold portion 21.

Figure 4:
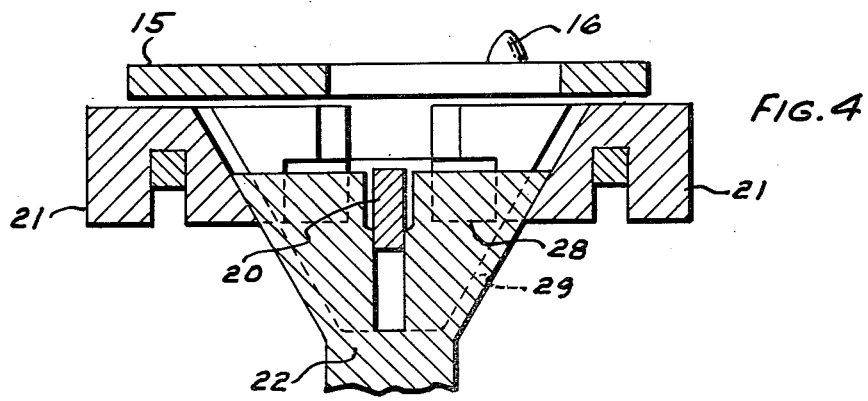
FIG. 4 is a cross-sectional view similar to FIG. 3 but showing the mold in its opened position.

As will now be apparent upon reference to FIGS. 3 and 4, when the forked mold portion 22 is drawn downwardly against the action of spring 24, the flanged edges 29 of the webs 28 wedge the two main mold portions 21 outwardly away from each other. When the spring 24 is permitted to move the plunger 23 and the forked mold portion 22 upwardly, the flanges 29 wedge the main mold portions 21 toward each other and bring their parting faces into contact.

A complete operation of the apparatus is now described for a fuller understanding of the invention. With the fixture 12 in its raised or retracted position illustrated in FIG. 1, a preformed piece part or parts, such as the illustrated spring contact arms 10, are arranged in the fixture in their proper positions. Before lowering the fixture 12, a predetermined quantity of suitable plastic material is preferably poured into the closed mold. The fixture 12 is then lowered by the arm 11 such that the lower ends of the contact arms 10 extend into the mold cavity, and into the plastic material contained therein.

After the plastic material has hardened sufficiently, the plunger 23 may be drawn downwardly through actuation of the cam roller 27. This draws the forked mold member 22 downwardly, which in turn causes opening movement of the main mold portions 21. At this point, the molded body is free of the mold and rests freely on the fixed mold portion 20. The arm 11 may now be actuated to raise the fixture 12 and the spring contact arms 10 with the molded body secured thereto.

An important feature of this mold is that the intermeshing arrangement of the various mold parts prevents movement of the molded body with respect to the fixture 12 during the opening movement of the mold. More particularly, as the forked mold member 22 moves downwardly, any tendency of this mold portion to pull the molded body downwardly, by virtue of adherence of the molded body to the upper arms of the forked mold portion, is resisted by the fixed mold portion 20 on which the molded body rests. The main mold portions 21 may also adhere to the molded body, particularly since each engages opposed faces of the molded body. As the main mold portions 21 move apart, the molded body will, of course, be broken loose from one but may continue to adhere to the other. However, the vertically extending upper arms of the forked mold member 22 bear against opposite sides of the molded body and prevent lateral movement of the molded body with either of the main mold portions 21.

It will thus be seen that the molded body is restrained against movement with any of the mold portions to which it might adhere. This is of great importance where the preformed piece parts are of a delicate nature, such as the illustrated spring contact arms 10, since substantial adherence of the molded body to any moving mold part which must be resisted entirely by the contact arms 10 may very readily bend or break the contact arms.

It should be appreciated that in order for the intermeshing mold parts to prevent movement of the molded body with another mold part during opening movement of the mold, it is necessary first that any mold part which is movable and which is to restrain the molded body from movement by another moving part, must be movable in a direction generally parallel to a portion of the mold cavity wall which it forms. Thus, the forked mold portion 22 moves substantially parallel to the side wall portions formed thereby. This is necessary since this wall portion must remain in movement-restraining contact with the molded body during at least the first portion of the opening movement.

It is also necessary that such portion of the mold cavity wall be arranged to face, at least in part, against the direction of opening movement of the other mold part. Thus, the portion of the side wall formed by either arm of the forked mold portion faces against the direction of opening movement of the corresponding main mold portion 21.

With these two characteristics existent, it will be seen that either arm of the forked mold member 22 is adapted, when in closed position, to resist movement of the molded body by the corresponding one of the main mold portions 21. Furthermore, as the forked mold member 22 moves toward its opened position, it remain in movement-restraining contact with the molded body.

It should be noted also that the fixed mold portion 20 faces against the direction of opening movement of the forked mold portion 22 and thereby is adapted to prevent movement of the molded body with the forked mold member.

Figure 6:
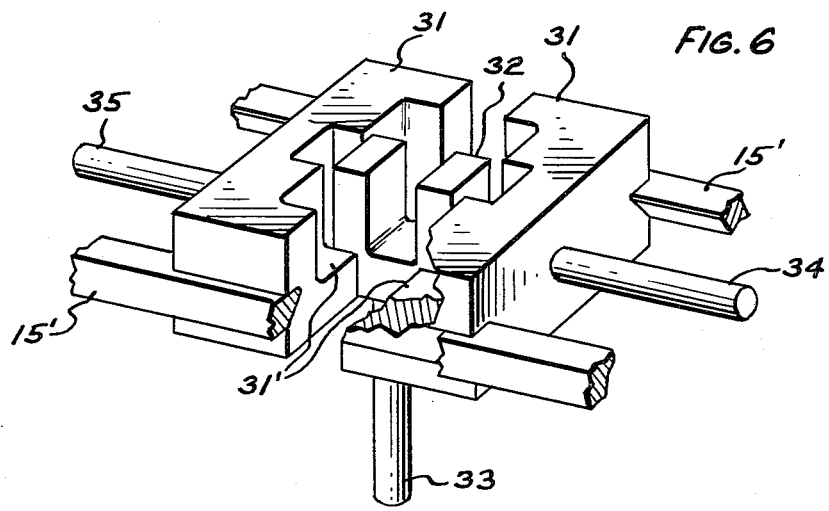
FIG. 6 is a perspective view of another embodiment of the invention.

The alternative embodiment illustrated in FIG. 6 operates in accordance with these same principles. This embodiment of the invention is identical to that of FIGS. 1–5 with the exceptions of the omission of the fixed mold part 20 and the revision of the remaining mold parts to compensate for this omission.

More particularly, main mold portions 31 are identical to the mold portions 21 of FIGS. 1–5 with the exception that the mold portions 31 include ledges 31' which constitute portions of the bottom wall or floor of the mold cavity. Similarly, the forked mold portion 32 has an elevated central portion, as compared to the mold portion 22 of FIGS. 1–5, whereby it forms the remaining portion of the floor of the mold cavity. It will be noted that the main mold portions 31 must have their bottom walls slotted, as shown, to permit relative movement of the vertical arms of the forked mold portion 32 therethrough.

The mold of FIG. 6 is simplified structurally over the embodiment of FIGS. 1–5 by omission of the dovetailed cam surfaces which interconnect the mold portions of the embodiment of FIGS. 1–5. In this case, separate opening and closing means 33, 34 and 35 are suggested for the three mold parts.

It will be seen that movement of the molded body by either of the main mold portions 31 in a horizontal direction will be prevented by the upper arms of the forked mold member 32, as in the case of the embodiment of FIGS. 1–5. In the embodiment of FIG. 6, downward movement of the molded body with the forked mold member 32 is prevented, not by fixed mold member, but by the other moving mold members 31. More particularly, each of the mold members 31 forms a mold cavity surface which faces against the direction of opening movement of the forked mold member 32, these mold cavity surfaces being the upper surfaces of the ledges 31'. Accordingly, if the molded body adheres to the forked mold member 32 and therefore tends to move downwardly therewith upon opening movement of the forked mold member, the molded body will bear against the ledges 31' and be restrained from such movement.

Also, since the main mold portions 31 move in directions substantially parallel to those restraining surfaces 31', the latter remain in movement-restraining contact with the molded body even though the mold portions 31 are moving toward their opened positions at the same time that the forked mold member 32 is being withdrawn downwardly.

Figure 7:
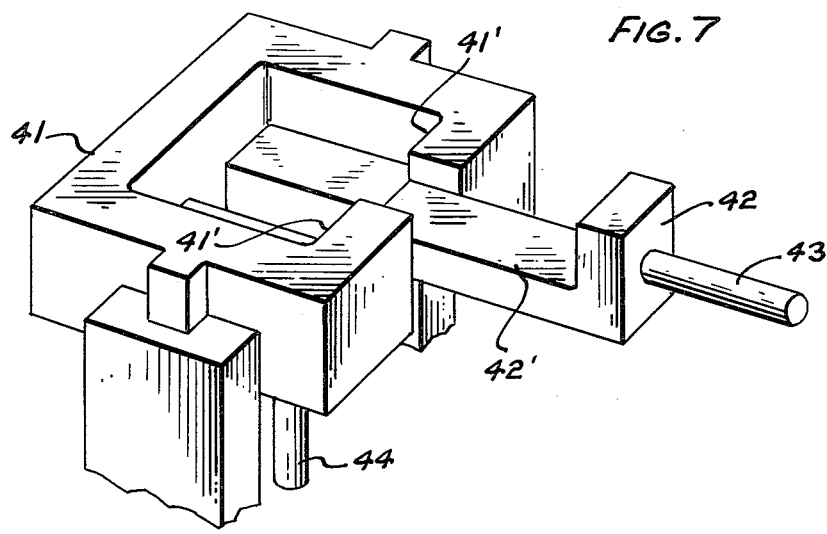
FIG. 7 is a perspective view of still another embodiment of the invention.

A further simplified embodiment of the invention is illustrated in FIG. 7 wherein a single main mold portion 41 is arranged for vertical movement with respect to the molded body. Another, horizontally moving mold portion 42 comprises a portion of the bottom and one side wall of the mold cavity. Here again, the apparatus has been simplified in its construction by omission of any interacting cam surfaces, the two mold parts being provided with separate opening and closing means 43 and 44.

It will be seen that downward movement of the molded body with the mold part 41 is prevented by an upwardly facing surface 42' of the mold portion 42. This surface 42' remains in movement-restraining contact with the molded body during retraction of the mold part 42 since the direction of movement of the mold part 42 is substantially parallel to the surface 42'. Similarly, movement of the molded body with the mold part 42 is restrained by surfaces 41' which face against the direction of movement of the mold part 42. These surfaces 41' remain in movement-restraining contact with the molded body during retraction of the mold portion 41 since the direction of opening movement of the mold part 41 is substantially parallel to the surfaces 41'.

It will now be appreciated that the illustrated embodiments of the invention include mold parts which are movable relatively between open and closed positions, one mold part resisting movement of the molded body by another mold part, even though the first mold part may be moving toward its open position. It will also be appreciated that the necessary physical characteristics of the mold parts have been set forth in detail.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a molding machine having a clamping device for gripping and supporting a piece part with one portion thereof in an open cavity of a mold whereby the piece part may be anchored in a molded body formed in the mold cavity and wherein the piece part and molded body are to be supported by the clamping device after removal from the mold cavity, means within the mold for preventing movement of the molded body with respect to the clamping device during the separation of the mold from the molded body, comprising a first mold part forming a first portion of the outer mold cavity wall and arranged for relative opening movement with respect to the clamping device and the molded body in a direction generally parallel to the plane of said first portion of the mold cavity wall to release the molded body, a second mold part forming a second portion of the outer mold cavity wall and arranged for relative opening movement with respect to the clamping device and the molded body in a direction generally parallel to the plane of said second portion of the mold cavity wall to release the molded body, said first portion of the mold cavity wall facing at least in part against the direction of opening movement of said second mold part, and said second portion of the mold cavity wall facing at least in part against the direction of opening movement of said first mold part, whereby each of said mold parts prevents movement of the molded body with the other mold part, and means for providing generally concurrent opening movement of said mold parts.

2. Molding apparatus as specified in claim 1 wherein said means include cooperating cam surfaces on said first and second mold parts so arranged that opening movement of one of said mold parts effects opening movement of the other.

3. In a molding machine having a clamping device for gripping and supporting a piece part with one portion thereof in an open cavity of a mold whereby the piece part may be anchored in a molded body formed in the mold cavity and wherein the piece part and molded body are to be supported by the clamping device after removal from the mold cavity, means within the mold for preventing movement of the molded body with respect to the clamping device during the separation of the mold from the molded body, comprising first and second mold parts forming, in combination, one portion of the outer mold cavity wall and arranged for relative opening movement with respect to the clamping device and the molded body in opposed directions generally parallel to the plane of said one portion of the mold cavity wall to release the molded body, a third mold part forming two opposed portions of the outer mold cavity wall and arranged for relative opening movement with respect to the clamping device and the molded body in a direction generally parallel to the planes of said two opposed portions of the mold cavity wall to release the molded body, said one portion of the mold cavity wall facing at least in part against the direction of opening movement of said third mold part, and said two opposed portions of the mold cavity wall facing respectively at least in part against the directions of opening movement of said first and second mold parts, whereby said first and second mold parts prevent movement of the molded body with said third mold part, and said third mold part prevents movement of the molded body with said first or second mold parts, and means for providing generally concurrent opening movement of said mold parts.

4. In a molding machine having a clamping device for gripping and supporting a piece part with one portion thereof in an open cavity of a mold whereby the piece part may be anchored in a molded body formed in the mold cavity and wherein the piece part and molded body are to be supported by the clamping device after removal from the mold cavity, means within the mold for preventing movement of the molded body with respect to the clamping device during the separation of the mold from the molded body, comprising first and second mold parts forming portions of the outer mold cavity wall and arranged for relative opening movement with respect to the clamping device and the molded body in opposed directions to release the molded body, a third mold part forming two opposed portions of the outer mold cavity wall and arranged for relative opening movement with respect to the clamping device and the molded body in a direction generally parallel to the planes of said two opposed portions of the mold cavity wall to release the molded body, said two opposed portions of the mold cavity wall facing respectively at least in part against the directions of opening movement of said first and second mold parts, whereby said third mold part prevents movement of the molded body with said first or second mold parts, and means for providing generally concurrent opening movement of said mold parts.

5. Molding apparatus as specified in claim 4 wherein said means include cooperating cam surfaces on said mold parts so arranged that opening movement of one of said mold parts effects opening movement of the others.

References Cited in the file of this patent

UNITED STATES PATENTS

| | | |
|---|---|---|
| Re. 19,780 | McKay et al. | Dec. 3, 1935 |
| 1,475,032 | Shrum et al. | Nov. 20, 1923 |
| 2,156,459 | Mucher | May 2, 1939 |
| 2,438,348 | Morin | Mar. 23, 1948 |
| 2,891,283 | Cramer et al. | June 23, 1959 |